United States Patent [19]
Lin

[11] Patent Number: 5,524,024
[45] Date of Patent: Jun. 4, 1996

[54] ADPCM SYNTHESIZER WITHOUT LOOK-UP TABLE

[75] Inventor: James Lin, Hsin Chu, Taiwan

[73] Assignee: Winbond Electronics Corporation, Hsin-Chu, Taiwan

[21] Appl. No.: 179,743

[22] Filed: Jan. 11, 1994

[51] Int. Cl.$^6$ ............................................. H04B 14/06
[52] U.S. Cl. ..................................... 375/244; 341/76
[58] Field of Search ............................. 375/240–245, 375/247; 370/7, 9; 381/29; 329/312; 332/109; 348/410; 341/53, 51, 76, 77

[56] References Cited

U.S. PATENT DOCUMENTS 4,860,313  8/1989  Shpiro ........................... 375/245

Primary Examiner—Young T. Tse
Attorney, Agent, or Firm—Meltzer, Lippe, Goldstein et al.

[57] ABSTRACT

The present invention provides a circuit for use in an ADPCM synthesizer for generating a function of a quantization step without the use of a look-up table. Illustratively, the function is represented in a piecewise linear fashion. This permits an ADPCM synthesizer to be implemented without the use of a memory storing a look-up table for the function so the area of the synthesizer chip can be reduced.

6 Claims, 6 Drawing Sheets

| | | |
|---|---|---|
| $q_n = 0$ | $T(0) =$ | 16 |
| $q_n = 1$ | $T(1) =$ | 17 |
| $q_n = 2$ | $T(2) =$ | 18 |
| $q_n = 3$ | $T(3) =$ | 19 |
| $q_n = 4$ | $T(4) =$ | 20 |
| $q_n = 5$ | $T(5) =$ | 22 |
| $q_n = 6$ | $T(6) =$ | 24 |
| $q_n = 7$ | $T(7) =$ | 26 |
| $q_n = 8$ | $T(8) =$ | 28 |
| $q_n = 9$ | $T(9) =$ | 30 |
| $q_n = 10$ | $T(10) =$ | 33 |
| $q_n = 11$ | $T(11) =$ | 36 |
| $q_n = 12$ | $T(12) =$ | 39 |
| $q_n = 13$ | $T(13) =$ | 42 |
| $q_n = 14$ | $T(14) =$ | 46 |
| $q_n = 15$ | $T(15) =$ | 50 |
| $q_n = 16$ | $T(16) =$ | 55 |
| $q_n = 17$ | $T(17) =$ | 60 |
| $q_n = 18$ | $T(18) =$ | 66 |
| $q_n = 19$ | $T(19) =$ | 72 |
| $q_n = 20$ | $T(20) =$ | 79 |
| $q_n = 21$ | $T(21) =$ | 86 |
| $q_n = 22$ | $T(22) =$ | 94 |
| $q_n = 23$ | $T(23) =$ | 103 |
| $q_n = 24$ | $T(24) =$ | 113 |
| $q_n = 25$ | $T(25) =$ | 124 |
| $q_n = 26$ | $T(26) =$ | 136 |
| $q_n = 27$ | $T(27) =$ | 149 |
| $q_n = 28$ | $T(28) =$ | 163 |
| $q_n = 29$ | $T(29) =$ | 179 |
| $q_n = 30$ | $T(30) =$ | 196 |
| $q_n = 31$ | $T(31) =$ | 215 |
| $q_n = 32$ | $T(32) =$ | 236 |
| $q_n = 33$ | $T(33) =$ | 259 |
| $q_n = 34$ | $T(34) =$ | 284 |
| $q_n = 35$ | $T(35) =$ | 312 |
| $q_n = 36$ | $T(36) =$ | 343 |
| $q_n = 37$ | $T(37) =$ | 377 |
| $q_n = 38$ | $T(38) =$ | 414 |
| $q_n = 39$ | $T(39) =$ | 455 |
| $q_n = 40$ | $T(40) =$ | 500 |
| $q_n = 41$ | $T(41) =$ | 550 |
| $q_n = 42$ | $T(42) =$ | 605 |
| $q_n = 43$ | $T(43) =$ | 665 |
| $q_n = 44$ | $T(44) =$ | 731 |
| $q_n = 45$ | $T(45) =$ | 804 |
| $q_n = 46$ | $T(46) =$ | 884 |
| $q_n = 47$ | $T(47) =$ | 972 |
| $q_n = 48$ | $T(48) =$ | 1069 |
| $q_n = 49$ | $T(49) =$ | 1175 |
| $q_n = 50$ | $T(50) =$ | 1292 |
| $q_n = 51$ | $T(51) =$ | 1421 |
| $q_n = 52$ | $T(52) =$ | 1563 |
| $q_n = 53$ | $T(53) =$ | 1719 |
| $q_n = 54$ | $T(54) =$ | 1890 |
| $q_n = 55$ | $T(55) =$ | 2079 |
| $q_n = 56$ | $T(56) =$ | 2286 |
| $q_n = 57$ | $T(57) =$ | 2514 |
| $q_n = 58$ | $T(58) =$ | 2765 |
| $q_n = 59$ | $T(59) =$ | 3041 |
| $q_n = 60$ | $T(60) =$ | 3345 |
| $q_n = 61$ | $T(61) =$ | 3679 |
| $q_n = 62$ | $T(62) =$ | 4046 |

| | T'0 | T'1 | T'2 | T'3 | T'4 | T'5 | T'6 | T'7 | T'8 | T'9 | T'10 | T'11 | q3 | q4 | q5 |
|---|---|---|---|---|---|---|---|---|---|---|---|---|---|---|---|
| | 0 | q0 | q1 | q2 | 1 | 0 | 0 | 0 | 0 | 0 | 0 | 0 | 0 | 0 | 0 |
| | 0 | 0 | q0 | q1 | q2 | 1 | 0 | 0 | 0 | 0 | 0 | 0 | 1 | 0 | 0 |
| | 0 | 0 | 0 | q0 | q1 | q2 | 1 | 0 | 0 | 0 | 0 | 0 | 0 | 1 | 0 |
| | 0 | 0 | 0 | 0 | q0 | q1 | q2 | 1 | 0 | 0 | 0 | 0 | 1 | 1 | 0 |
| | 0 | 0 | 0 | 0 | 0 | q0 | q1 | q2 | 1 | 0 | 0 | 0 | 0 | 0 | 1 |
| | 0 | 0 | 0 | 0 | 0 | 0 | q0 | q1 | q2 | 1 | 0 | 0 | 1 | 0 | 1 |
| | 0 | 0 | 0 | 0 | 0 | 0 | 0 | q0 | q1 | q2 | 1 | 0 | 0 | 1 | 1 |
| | 0 | 0 | 0 | 0 | 0 | 0 | 0 | 0 | q0 | q1 | q2 | 1 | 1 | 1 | 1 |

ADPCM SYNTHESIZER WITHOUT LOOK-UP TABLE

FIELD OF THE INVENTION

The present invention relates to an Adaptive Differential Pulse Code Modulation (ADPCM) synthesizer which does not require the use of a look-up table.

BACKGROUND OF THE INVENTION

In signal processing applications such as speech, data is compressed before it is stored and decompressed when it is retrieved. Such compression/decompression reduces the amount of memory required to store the data. One of the most common compression/decompression techniques is ADPCM.

When ADPCM is used, the analysis (compression) process is as follows:
1. Consider the discrete data samples, $X_0, X_1, X_2, \ldots X_{N-1}$. It should be noted that this data has maximum points.
2. Select an initial estimated value $\hat{X}_0$ and an initial quantization step $q_{ini}$;
3. From the original data value $X_0$ and the initial estimated data value $\hat{X}_0$, a quantization step size $q_0$ and compressed data value $D_0$ can be obtained as follows:

$$q_0 = f_1(X_0, \hat{X}_0, q_{ini})$$

$$D_0 = f_2(X_0, \hat{X}_0, q_{ini})$$

4. From the obtained values $q_0, D_0$, the next estimated value, $$\hat{X}_1 = \hat{X}_0 + T(q_0) + D_0$$

is obtained, where T is a function of q (quantization step). The function T is usually an exponential function and, conventionally, a look-up table stored in a memory is used to implement this function. The function T(q) is illustrated in FIG. 1.

5. The values $q_n, D_n, \hat{X}_n$ can be calculated as follows:

$$q_n = f_1(X_{n-1}, \hat{X}_{n-1}, q_{n-1})$$

$$D_n = f_2(X_{n-1}, \hat{X}_{n-1}, q_{n-1})$$

$$\hat{X}_n = \hat{X}_{n-1} + T(q_{n-1}) * D_{n-1}$$

6. In this way, the original data $X_0, X_1, X_2, \ldots, X_{N-1}$ are transformed into estimated data $\hat{X}_0, \hat{X}_1, \hat{X}_2, \ldots, \hat{X}_{N-1}$ and the encoded (compressed) data $D_0, D_1, D_2, \ldots, D_{N-1}$ are also obtained.

Generally, when ADPCM is used, the above-described analysis process is carried out in software using a computer to generate the compressed data $D_0, D_1, D_2, \ldots, D_{N-1}$.

When ADPCM is used, the synthesis (decompression) process is as follows:
1. Select the same initial quantization step size value $q_{ini}$ and estimated value $\hat{X}_0$.
2. From the compressed data $D_0, D_1, \ldots, D_N$, the next estimated value $\hat{X}_1, \hat{X}_2, \ldots$ and quantization step $q_0, q_1, \ldots$ can be calculated as follows:

$$\hat{X}_{n+1} = \hat{X}_n + T(q_n) * D_n$$

$$q_{n+1} = f_3(q_n, D_n)$$

Using this formulation, the sequence of estimated values $\hat{X}_0, \hat{X}_1, \hat{X}_2, \ldots, \hat{X}_N$ is regenerated from the compressed data.

FIG. 2 schematically illustrates a circuit 10 for performing the ADPCM synthesis process described above. In the circuit 10 of FIG. 2, the input is the compressed data $D_n$. The compressed data $D_n$ is received at the input 11. The circuit 12 receives the inputs $D_n$, $q_n$ at the inputs 13, 14 respectively. The output of the circuit 12 is $q_{n+1} = f_3(q_n, D_n)$ which appears at the output 15. The output $q_{n+1}$ is then processed by the unit delay 16 so that $q_n$ is present at the input 13. The unit delay 16 also transmits the value $q_n$ to a memory circuit 20 which stores a look-up table for the function $T(q_n)$. FIG. 3 is an exemplary look-up table for the function $T(q_n)$ and thus illustrates the values stored in the memory 20. The circuit 22 multiplies $T(q_n)$ and $D_n$ and outputs the product $T(q_n)*D_n$. The product $T(q_n)*D_n$ is one input to the summer 24. The other input is $\hat{X}_n$. The value $\hat{X}_n$ is generated by the unit delay 26. The output of the summer 24 is $\hat{X}_{n+1}$ which is equal to $\hat{X}_n + T(q_n)*D_n$. The value $\hat{X}_{n+1}$ is fed back to the unit delay 26 whose output is $\hat{X}_n$.

The values contained in the look-up table stored in the memory 20 of FIG. 2 and explicitly set forth in FIG. 3 are illustrative only and are obtained according to the formula:

$$q_n = \text{integer part of } q_{n-1}*1.1$$

where $q_n = 16$.

The memory 20 of FIG. 2 is shown in greater detail in FIG. 4. As shown in FIG. 4, the memory 20 has six input pins for the 63 steps $q_n = 0$ to $q_n = 62$ and twelve output pins for the output values $T(q_n)$. Thus, the memory 20 requires $63 \times 12 = 756$ bits. This memory cannot be easily divided into smaller blocks and, thus, results in a significant increase in the chip size for the ADPCM synthesizer.

Accordingly, it is an object of the present invention to provide an ADPCM synthesizer which does not utilize a memory storing a look-up table to implement the function $T(q_n)$.

SUMMARY OF THE INVENTION

To carry out this objective, the present invention provides a circuit which implements the function $T(q_n)$ without use of a look-up table stored in a memory.

In accordance with the present invention, the function $T(q_n)$ is represented in a circuit in a piecewise linear fashion. Illustratively, the input $q_n$ has six bits $q_5q_4q_3q_2q_1q_0$. The basic output value is $1q_2q_1q_00$. This basic output value is shifted a number of bits to the left to generate the final output $T(q_n)$ depending on the value $q_5q_4q_3$. For example, if $q_n = 8 = 001000$, then the basic value $= 1q_2q_1q_00 = 10000 = 16$. The number of shifts to the left is given by $q_5q_4q_3 = 001$. Thus, the output value $T(q_n) = 100000 = 32$ is obtained by shifting the basic value one place to the left.

BRIEF DESCRIPTION OF THE DRAWING

FIG. 3 illustrates values comprising a look-up table for the function $T(q_n)$ stored in a memory in the synthesizer circuit of FIG. 2.

FIG. 7 is a table which relates inputs and outputs for the circuit of FIG. 6.

DETAILED DESCRIPTION OF THE INVENTION

Figure 5:
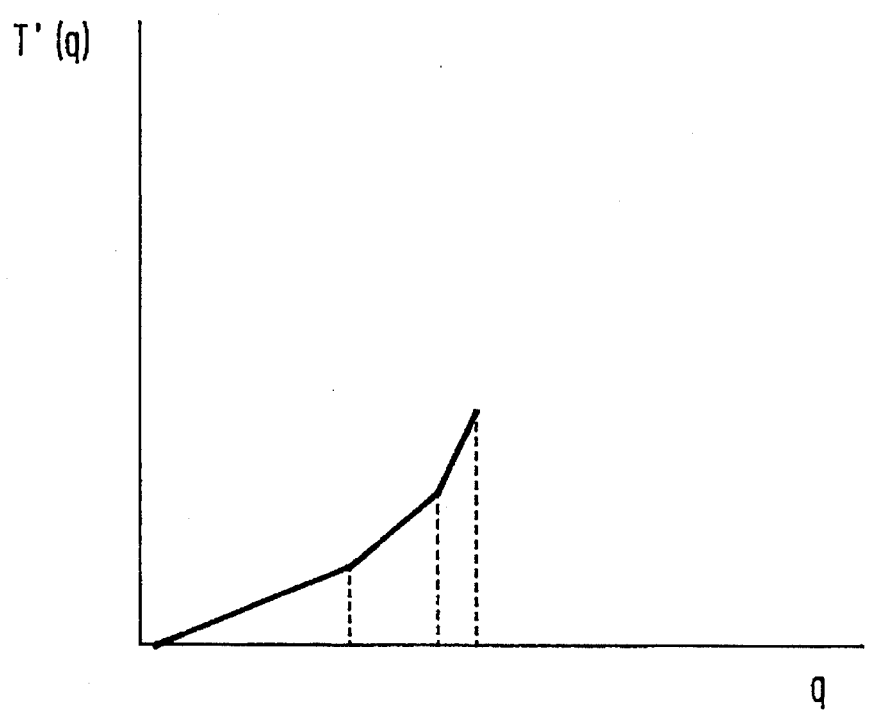
FIG. 5 is a piecewise linear representation of the function $T(q_n)$.

In accordance with the present invention, the exponential function $T(q_n)$ is represented in a piecewise linear manner. A piecewise linear representation $T'(q_n)$ of an exponential function $T(q_n)$ is illustrated in FIG. 5. Thus, the function $T(q_n)$ illustrated in the look-up table of FIG. 3 is approximated by $$T'(0)=16$$

$$T'(q_n)=(16+(q_n-8*(q_n/8))*2)*2^{(q_n/8)}$$

where $(q_n/8)$ is the integer part of $q_n$ divided by eight.
For example, if $$\text{for } q_n=1, T'(1)=(16+(1-8*0)*2)*2^0=18$$

$$\text{for } q_n=8, T'(8)=(16+(8-8*1)*2)*2^1=32$$

Figure 6:
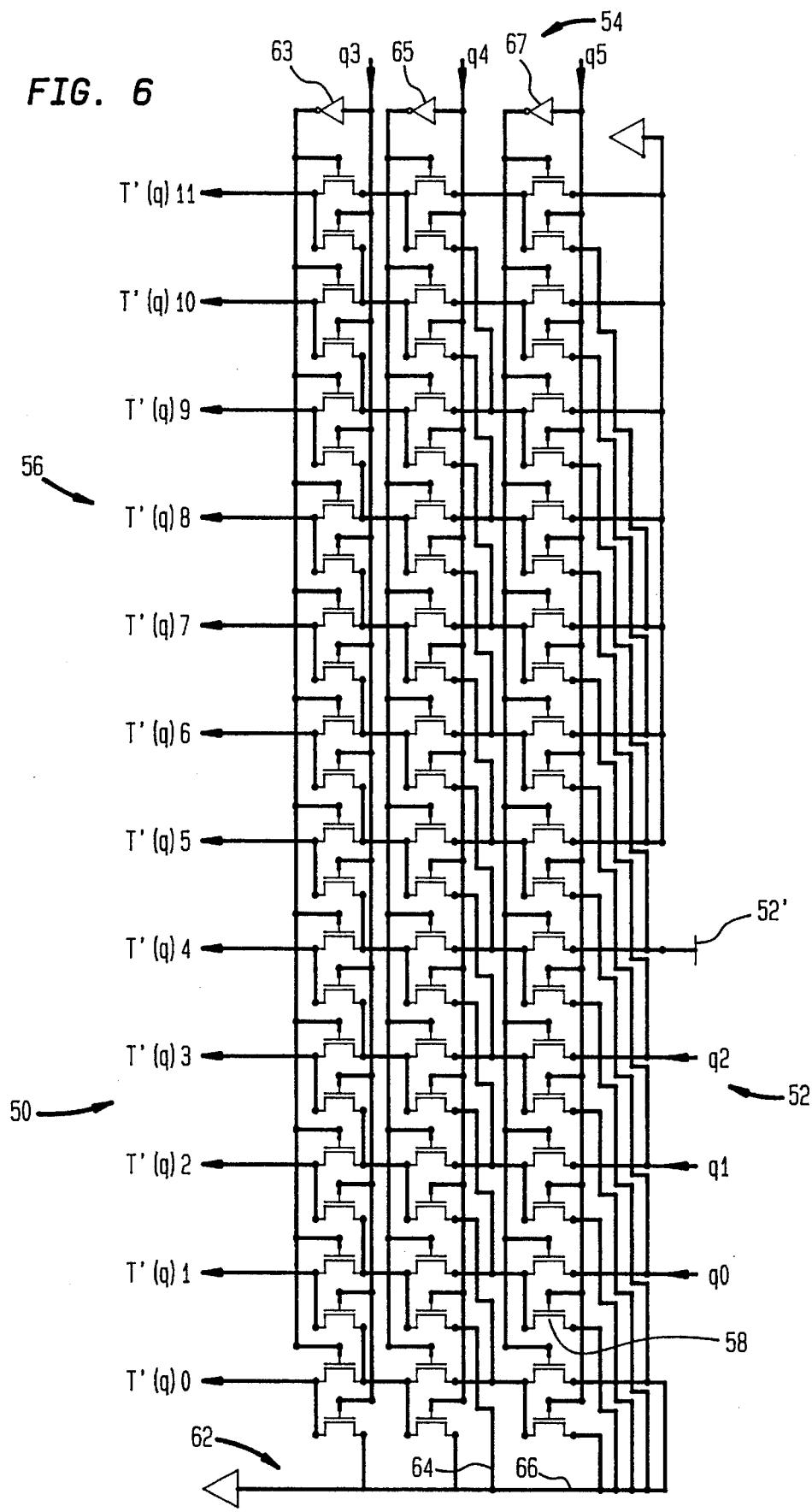
FIG. 6 is a circuit which implements a piecewise linear representation of the function $T(q_n)$ in accordance with the present invention.

FIG. 6 is a circuit 50 for implementing the piecewise linear function $T'(q_n)$. The quantization step size $q_n$ is illustratively represented by six bits, i.e., $q_n=q_5q_4q_3q_2q_1q_0$. The circuit 50 has two sets of inputs. The first set of inputs 52 receives the bits $q_2q_1q_0$. The second set of inputs 54 receives the bits $q_5q_4q_3$. The outputs 56 comprise twelve bit positions of the values $T'(q_n)$. To generate the outputs 56 from the inputs 52, 54, the circuit 50 comprises a plurality of processing elements in the form of MOS transistors 58. The input 52 above $q_2$ (i.e., the input 52') is set to logic "1" and the remainder of the inputs 52 (besides the inputs receiving $q_2$, $q_1$, $q_0$) are set to logic "0".

In the circuit 50, the transistors 58 are arranged in three columns 62, 64, 66. The bit values $q_3$, $q_4$, $q_5$ are applied to the gates of the transistors in the columns 62, 64, 66, either directly or via corresponding inverters 63, 65, 67. The bit values $q_0$, $q_1$, $q_2$ are connected to the drain terminals of particular transistors in the column 66. The source terminals of the transistors in the column 66 are connected to the drain terminals of particular transistors in the column 64. The source terminals of the transistors in the column 64 are connected to the drain terminals of particular transistors in the column 62. The source terminals of the transistors in the column 62 are connected to corresponding outputs 56.

The circuit 50 operates as follows:

At the inputs 52, there are present the values $00000001q_2q_1q_00$ which are obtained from the bits $q_2q_1q_0$ of the quantization step $q_n$. The basic value $1q_2q_1q_00$ is shifted to the left a particular number of places depending on the values $q_5q_4q_3$ as follows:

When $q_5=0$, the output data is the same as the input data, i.e., $00000001q_2q_1q_00$, when $q_5=1$, the input data is shifted four places to the left so that the output data is $0001q_2q_1q_000000$ When $q_5=0$, and $q_4=0$, the output data is unchanged from the input, i.e., $00000001_{q2}q_1q_00$ When $q_5=1$, and $q_4=0$, the input data is shifted four places to the left so the output data is $0001q_2q_1q_000000$ When $q_5=0$, and $q_4=1$, the input data is shifted two places to the left so that the output data is $000001q_2q_1q_0000$ When $q_5=1$, and $q_4=1$, the input data is shifted six places to the left so that the output data is $01q_2q_1q_00000000$ When $q_3$ is equal to 1, there is an additional shift of one place to the left.

FIG. 7 is a table which summarizes the relationship between $q_5q_4q_3$ and the output data.

Figure 1:
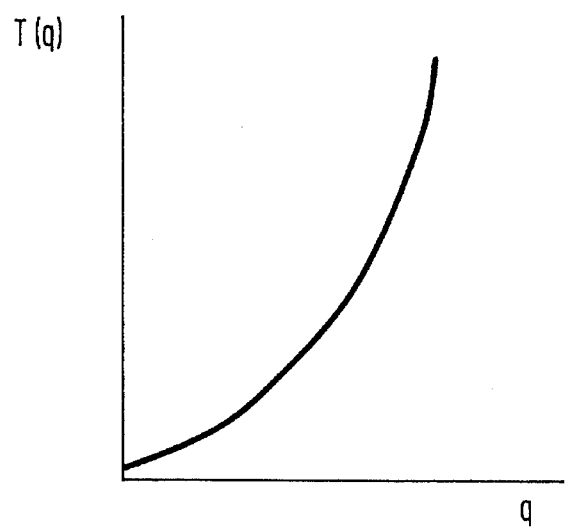
FIG. 1 schematically illustrates the function $T(q_n)$.
Figure 2:
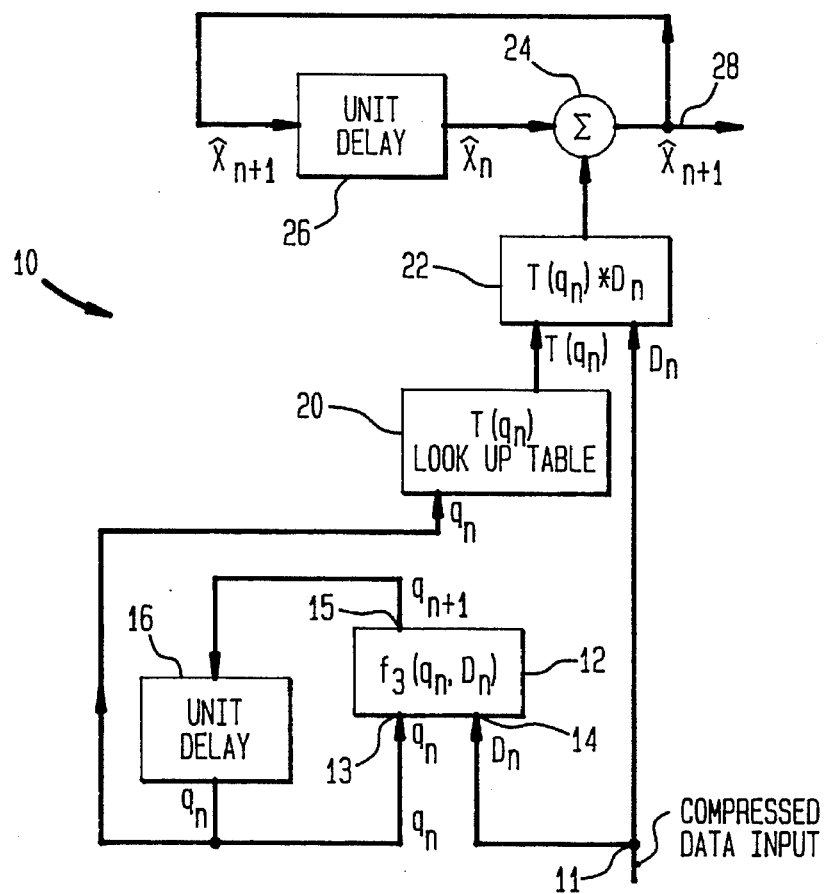
FIG. 2 schematically illustrates a prior art ADPCM synthesizer.
Figure 4:
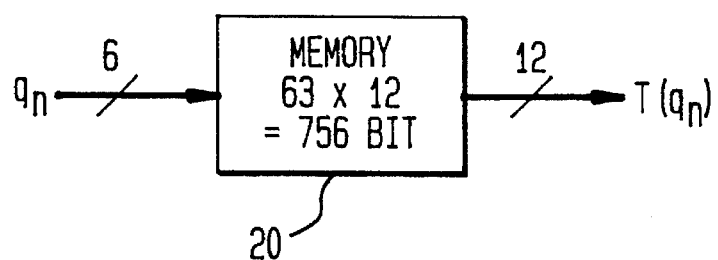
FIG. 4 illustrates a memory which stores the look-up table of FIG. 3.
Figure 8:
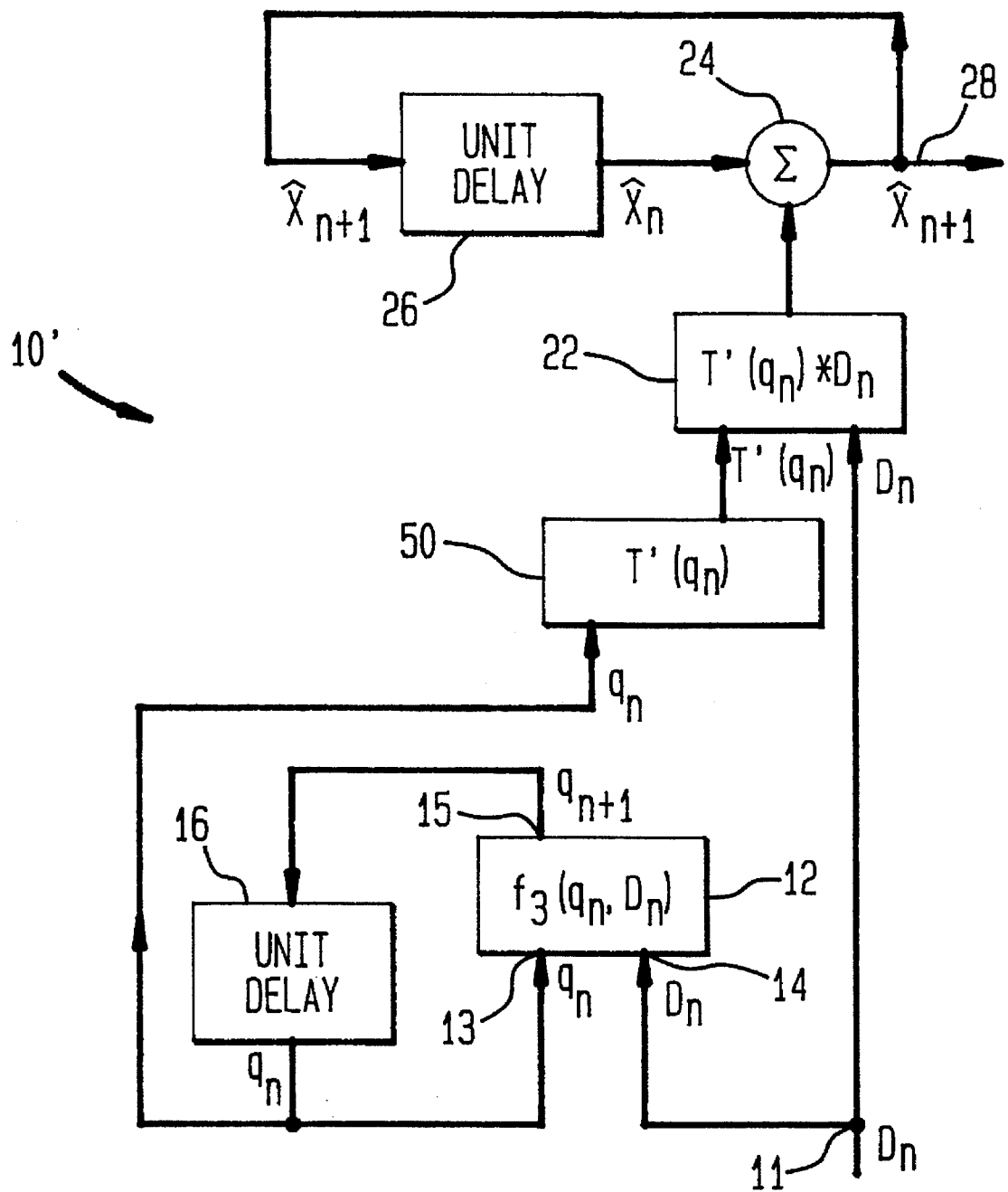
FIG. 8 is an ADPCM synthesizer which utilizes the circuit of FIG. 6.

FIG. 8 illustrates an ADPCM circuit 10' in accordance with the present invention. In FIG. 7, the circuit 50 of FIG. 5 replaces the memory table 20 in the prior art ADPCM synthesizer of FIG. 2. This reduces the chip area in the ADPCM synthesizer.

Finally, the above described embodiments of the invention are intended to be illustrative only. Numerous alternative embodiments may be devised without departing from the spirit and scope of the following claims.

The claimed invention is:

1. A circuit for use in an adaptive differential pulse code modulation synthesizer for implementing a function $T'(q_n)$ of a previously determined quantization step $q_n$ which is represented by a plurality binary bits comprising:

a first set of inputs for receiving a first group of said binary bits of said previously determined quantization step $q_n$;

a second set of inputs for receiving a second group of said binary bits of said determined quantization step $q_n$; and a plurality of processing elements for processing said first and second groups of binary bits to generate a binary output representing said function $T'(q_n)$ having a basic value formed from said first group of binary bits, wherein said basic value is shifted by a number of places determined by said second group of binary bits;

wherein said binary output representing said function $T'(q_n)$ is multiplied in a multiplier with a compressed data value $D_n$ and the product $T'(q_n)*D_n$ thus produced is summed in a summer with a previously determined estimated decompressed data value $\hat{X}_n$ to obtain a next decompressed data value $\hat{X}_{n+1}$.

2. The circuit of claim 1 wherein said quantization step $q_n$ is represented by the binary bits $q_5q_4q_3q_2q_1q_0$, said basic value is given by $1q_2q_1q_00$, and the number of places the basic value is shifted is given by $q_5q_4q_3$.

3. The circuit of claim 1 wherein said function of said quantization step is a piecewise linear function.

4. An adaptive differential pulse code modulation synthesizer circuit comprising:

a first circuit which receives a previously determined quantization step $q_n$ and which outputs a function $T'(q_n)$, said first circuit representing said function $T'(q_n)$ in a piecewise linear fashion, a second circuit which multiplies $T'(q_n)$ and a compressed data value $D_n$ to obtain a product $T'(q_n)*D_n$, and a summer which sums a previously determined estimated decompressed data value $\hat{X}_n$ and $T'(q_n)*D_n$ to obtain a next estimated decompressed data value $\hat{X}_{n+1}$ wherein said quantization step $q_n$ is represented by a plurality of binary bits and said first circuit comprises:

a first set of inputs for receiving a first group of said binary bits, a second set of inputs for receiving a second group of said binary bits, and a plurality of processing elements for processing said first and second groups of binary bits to generate a binary output having a basic value formed from said first set of binary bits, wherein said basic value is shifted by a number of places determined by said second set of binary bits.

5. The synthesizer circuit of claim 4 wherein said synthesizer circuit includes circuit means for obtaining a next quantization step $q_{n+1}$ as a function of said previously determined quantization step $q_n$ and said compressed data value $D_n$.

6. An adaptive differential pulse code modulation synthesizer circuit comprising:

a first circuit for receiving a previously determined quantization step $q_n$ and for outputting a function $T'(q_n)$, which is a piecewise linear implementation of an exponential function $T(q_n)$, without the use of a look-up table storing values of said function $T'(q_n)$, a second circuit for multiplying $T'(q_n)$ and a compressed data value $D_n$, and a summer for summing the product $T'(q_n)*D_n$ outputted by said second circuit and a previously determined estimated compressed data value $\hat{X}_n$ to obtain a next decompressed data value $\hat{X}_{n+1}$.

* * * * *